United States Patent [19]

Mosley et al.

[11] Patent Number: 4,499,585
[45] Date of Patent: Feb. 12, 1985

[54] METHOD AND APPARATUS FOR PRODUCING A SHAPED SPECTRUM MODULATING SIGNAL

[75] Inventors: William H. Mosley; David E. Sanders, both of St. Petersburg; Richard E. Roberson, New Port Richey, all of Fla.

[73] Assignee: E-Systems, Inc., Dallas, Tex.

[21] Appl. No.: 434,415

[22] Filed: Oct. 14, 1982

[51] Int. Cl.³ .............................................. H03C 3/04
[52] U.S. Cl. ........................................ 375/62; 375/38; 332/16 R
[58] Field of Search ...................... 375/94, 95, 75, 23, 375/25, 38, 39, 62; 328/127, 129, 140; 307/228; 455/60; 332/9 R, 23 R, 16 R

[56] References Cited

U.S. PATENT DOCUMENTS

| | | | |
|---|---|---|---|
| 3,206,681 | 9/1965 | Brown | 375/9 X |
| 3,714,581 | 1/1973 | Sage | 375/9 X |
| 3,796,960 | 3/1974 | Frizzell et al. | 328/127 |
| 3,906,377 | 9/1975 | Harris | 328/127 |
| 3,995,178 | 11/1976 | Gilbert | 328/127 |
| 4,223,237 | 9/1980 | Yamada et al. | 328/127 |

Primary Examiner—Robert L. Griffin
Assistant Examiner—Stephen Chin
Attorney, Agent, or Firm—Albert M. Crowder, Jr.

[57] ABSTRACT

A modulating circuit (10) receives a UHF carrier signal together with a digital input signal for data along with a data clock. A channelizer circuit (60) produces I and Q channel digital data signals derived from the digital input signal. The I and Q channel signals are utilized to trigger one shot circuits (70, 72, 74 and 76) to produce positive and negative pulses corresponding to the signal transitions of the input signals thereto. These pulse signals are provided to integrate and hold circuits (80, 82) which serve to have positive and negative integration, thereby producing ramp signal segments in place of the sudden transitions of the rectangular digital input signals. The resulting data signals from the integration process are passed through diode shaper circuits (82, 92) and low pass filters (88, 94) to produce spectrum shaped I and Q channel modulating signals which have a limited bandwidth. The modulating signals are input to mixers (36, 40) together with respective in-phase and quadrature phase carrier signals to provide amplitude and phase modulation of the carrier signals. The resulting amplitude and phase modulated carrier signals are combined in a summation circuit (44) to produce a resulting modulated, band limited carrier signal.

22 Claims, 5 Drawing Figures

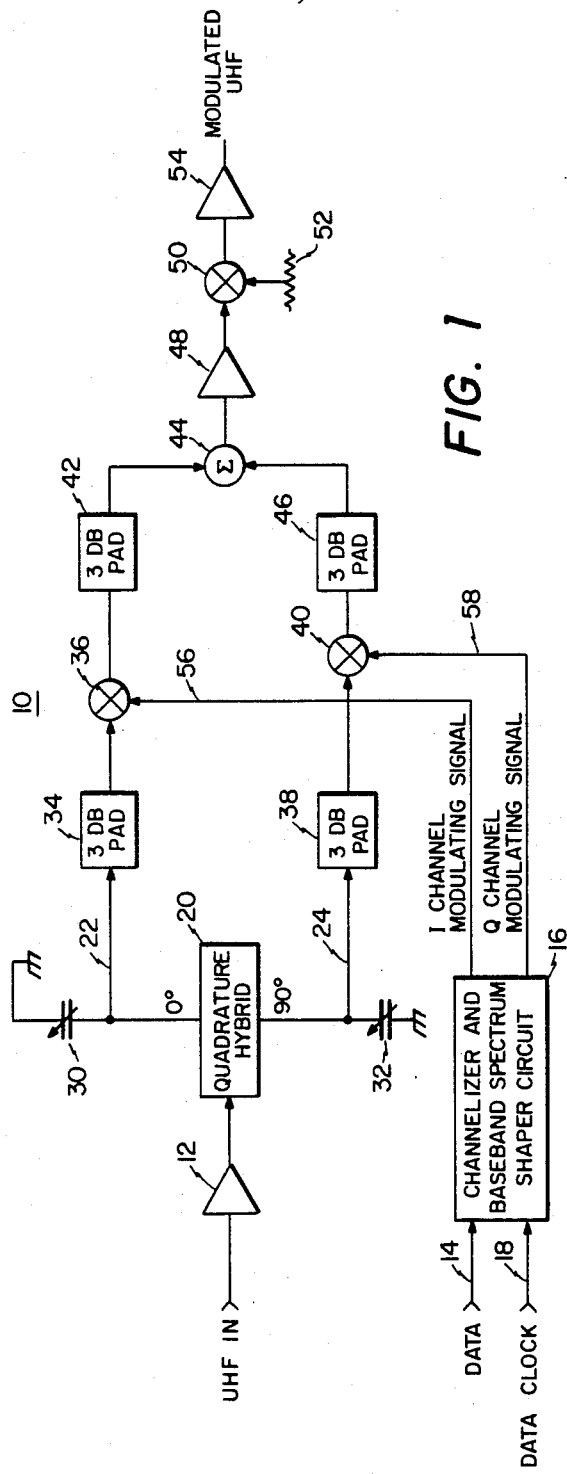
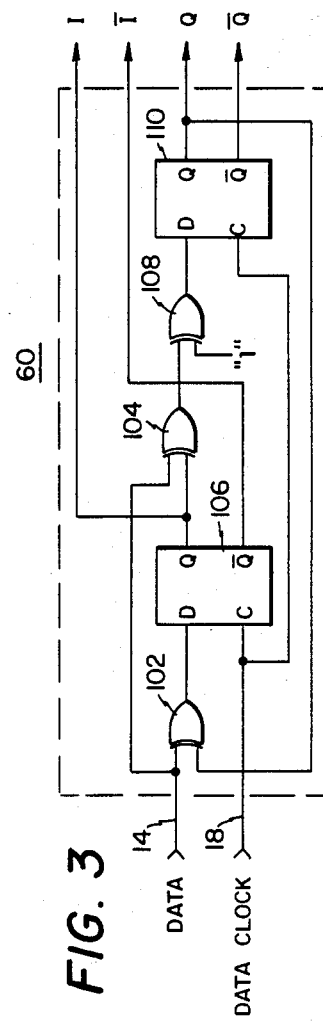
FIG. 1
FIG. 3

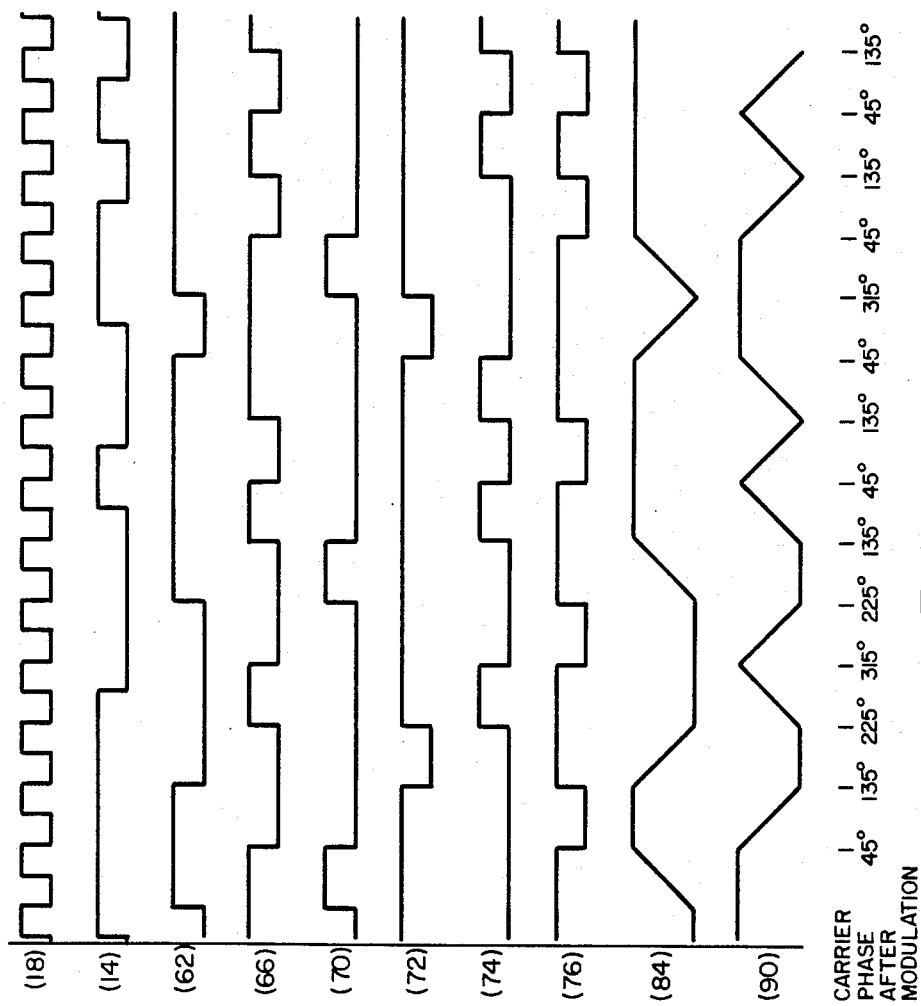

METHOD AND APPARATUS FOR PRODUCING A SHAPED SPECTRUM MODULATING SIGNAL

TECHNICAL FIELD

The present invention pertains to electronic communications and in particular to the modulation of a carrier signal.

BACKGROUND OF THE INVENTION

In conventional phase shift modulators the modulated signal must be spectrum shaped before it is transmitted in order to reduce adjacent channel interference. The phase modulation is typically carried out at a fixed frequency. After the phase modulation the modulated signal is bandpass filtered to shape its spectrum. The modulated signal is then translated up to the transmit frequency. The modulated carrier at the transmit frequency is then passed through another bandpass filter centered at the transmit frequency. This conventional modulation technique requires expensive and bulky bandpass filters as well as a frequency translator.

In view of the above conventional phase modulation technique, there exists a need for a method and apparatus to carry out phase modulation in such a way as to eliminate the need for the bandpass filters and the frequency translator.

SUMMARY OF THE INVENTION

A selected embodiment of the present invention comprises a method of producing a shaped spectrum modulating signal which is derived from an input signal having first and second data states. The method comprises the steps of first detecting transitions in the input signal from the first data state to the second data state and from the second data state to the first data state. In the next step there is produced a data signal which has a positive ramp signal segment upon the detection of a tansition in the input signal from the first data state to the second data state and has a negative ramp signal segment upon the detection in the input signal of a transition from the second data state to the first data state. Finally, the data signal is low pass filtered to produce the shaped spectrum modulating signal.

BRIEF DESCRIPTION OF THE DRAWINGS

For a more complete understanding of the present ivention and the advantages thereof, reference is now made to the following description taken in conjunction with the accompanying drawings in which:

FIG. 1 is a schematic illustration of a modulating circuit in accordance with the present invention, FIG. 3 is a logic diagram illustrating the structure of the channelizer shown in FIG. 2, FIG. 4 is an illustration of waveforms which are present in the modulating circuit shown in FIGS. 1 and 2, FIG. 5 is an illustration of signal waveforms for the circuit shown in FIG. 2.

DETAILED DESCRIPTION OF THE INVENTION

Figure 2:
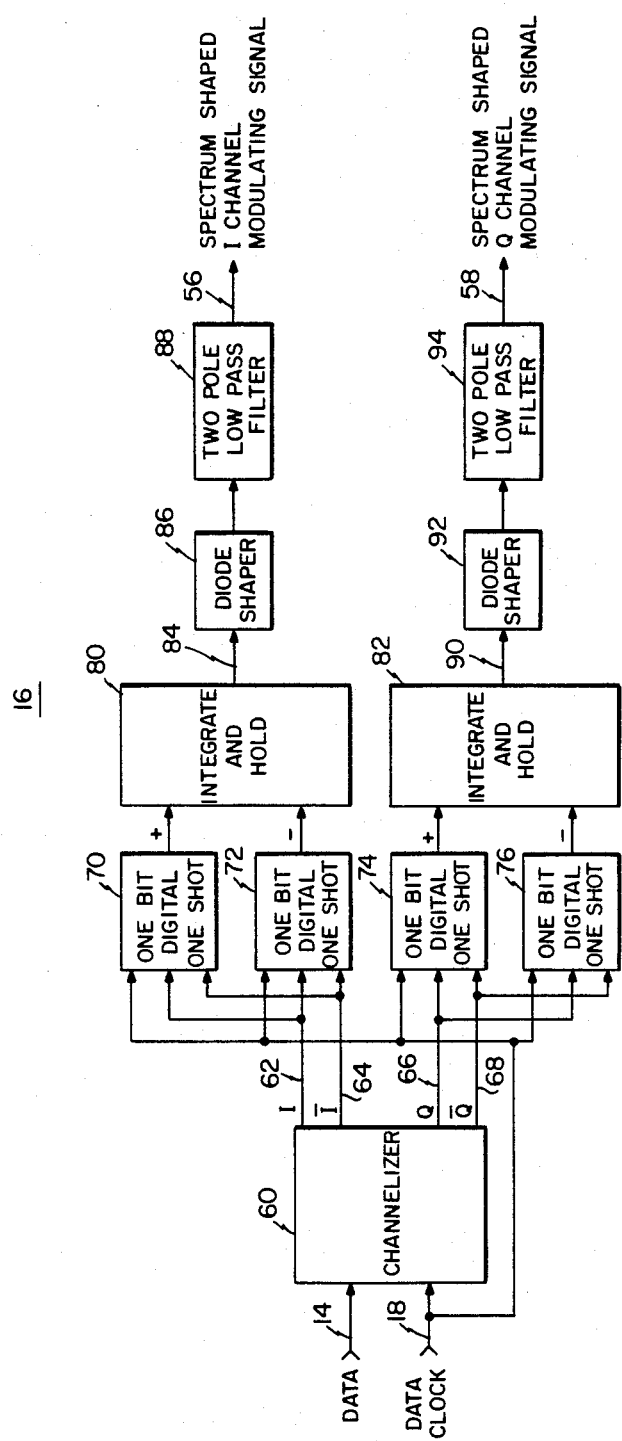
FIG. 2 is a block diagram showing the structure of the channelizer and baseband spectrum shaper circuit illustrated in FIG. 1.

Referring now to FIG. 1 there is illustrated a modulating circuit 10 having a UHF carrier signal input to an amplifier 12. Data is input as a digital input signal through a line 14 to a channelizer and baseband spectrum shaper circuit 16. The digital input signal has first and second data states. A data clock signal is input through a line 18 to the circuit 16.

The UHF carrier signal from amplifier 12 is provided to a quadrature hybrid 20 to produce an inphase carrier signal at a line 22 and a quadrature phase carrier signal, having a 90° phase shift, at a line 24. A variable capacitor 30 is connected between line 22 and ground. A variable capacitor 32 is connected between line 24 and ground.

The in-phase carrier signal for the line 22 is passed through a 3 db attenuation pad 34 to a mixer 36. The quadrature phase carrier signal at line 24 is passed through a 3 db attenuation pad 38 to a mixer 40.

The output from the mixer 36 is passed through a 3 db attenuation pad 42 to a first input of a summation circuit 44. The output of the mixer 40 is passed through a 3 db attenuation pad 46 to a second input of the summation circuit 44. The output of the summation circuit 44 is provided to an amplifier 48 which in turn passes the carrier signal through a mixer 50. The mixer 50 together with a resistor 52 serves to multiply the carrier signal by a lower amplitude fixed dc signal to reduce the AM modulation introduced by the phase modulation of the carrier signal. The output from the mixer 50 is then passed through an amplifier 54 to produce a modulated UHF signal comprising a modulated, band limited carrier signal at the transmit frequency.

The channelizer and baseband spectrum shaper circuit 16 receive the data as the digital input signal together with the data clock and produces digital I and Q channel signals which are then band limited to produce a shaped spectrum I channel modulating signal which provides the second input to the mixer 36 through a line 56 and a shaped spectrum Q channel modulating signal which comprises the second input to the mixer 40 through a line 58. The circuit 16 is described in further detail in FIGS. 2 and 3.

Operation of the modulating circuit 10 is now briefly described in reference to FIG. 1. A UHF carrier signal is input through the amplifier 12 to the quadrature hybrid 20 to produce the in-phase carrier signal at line 22 and the quadrature phase carrier signal at line 24. Variable capacitors 30 and 32 adjust out minor phase inaccuracies. The inphase carrier signal is phase and amplitude modulated by the I chanel modulating signal, which has previously been band limited, at the mixer 36. The mixer 36 produces a phase and amplitude modulated inphase carrier signal which is input to the summation circuit 44. Likewise, the quadrature phase carrier signal is input to the mixer 40 to be phase and amplitude modulated by the Q channel modulating signal to produce a phase and amplitude modulated quadrature carrier signal which is also input to the summation circuit 44. The varying amplitude changes of the inputs to circuit 44 cause a varying phase vector when summed.

The output from the summation circuit 44 is the resulting band limited, modulated carrier signal which is at a selected transmit frequency. Note that there has been no frequency translation carried out in the modulating process. The transmit carrier signal from summation circuit 44 is then passed through amplifier 48, mixer 50 and amplifier 54 to produce the resulting transmit signal.

In the modulation process described for circuit 10 in FIG. 1 there have not been utilized the conventional bandpass filters for either the modulating signal or the modulated carrier signal as in the usual practice. Further, there has not been utilized a frequency translator since the phase modulation has been carried out at the transmit frequency. The present invention thus reduces the number of components required for the modulating circuit.

The channelizer and baseband spectrum shaper circuit 16 is further described in reference to FIG. 2. The digital input signal for the data together with the data clock are input to a channelizer circuit 60 which produces digital I and Q input signals that are derived from the digital input signal at line 14. Circuit 60 performs two-phase to four phase conversion and is further described in reference to FIG. 3. The circuit 60 produces the true and inverse for each of the I and Q channel digital signals. The I, Ī, Q and $\overline{Q}$ digital data signals are produced respectively at lines 62, 64, 66 and 68. The signals at these lines serve as inputs for the remaining components of circuit 16. The I and Q digital channel signals have first and second data states.

The data clock signal at line 18 is a first input to a plurality of one bit digital one shot circuits 70, 72, 74 and 76. The I channel digital signal at line 62 and the Ī digital signal at line 64 are input to both of the one shot circuits 70 and 72. The Q and $\overline{Q}$ digital signals at lines 66 and 68 are input to both of the one shot circuits 74 and 76. Each of the one shot circuits 70, 72, 74 and 76 produces a pulse one clock period in width upon receipt of a selected signal transition at the input thereof. The circuit 70 produces a positive pulse upon receipt of a positive signal transition for the I channel digital signal. The circuit 72 produces a negative pulse upon receipt of a negative signal transition for the I channel digital signal. The circuit 74 produces a positive pulse upon receipt of a positive signal transition for the Q channel digital signal and, the circuit 76 produces a negative pulse upon receipt of a negative transition for the Q channel digital signal.

The pulse signal outputs of the circuits 70 and 72 are input to an integrate and hold circuit 80. The output from circuit 70 causes the circuit 80 to perform positive integration and the pulse output from circuit 72 causes the circuit 80 to perform negative integration. The output of the circuits 74 and 76 is input to an integrate and hold circuit 82. The pulse output of circuit 74 causes circuit 82 to perform positive integration and the negative output from circuit 76 causes the circuit 82 to perform negative integration. During the time no pulses are driving the input to integrate and holds 80 and 82, the integrated positive or negative output is held at a constant level.

The integrate and hold circuits 80 and 82 thus produce positive and negative ramp signal segments by the virtue of the action of integrating positive and negative rectangular pulse signals. The output of circuit 80 is a data signal which is passed through a line 84 to a diode shaper circuit 86. The circuit 86 serves to round the linear transitions of the data signal at line 84. The data signal is further passed through a two pole low pass filter 88 to remove higher frequency components of the data signal. At the output of the filter 88 there is produced a shaped spectrum I channel modulating signal at the line 56.

The integrate and hold circuit 82 produces a data signal at a line 90. This data signal is passed through a diode shaper circuit 92 and is then passed through a two pole low pass filter 94 to produce a shaped spectrum Q channel modulating signal at line 58. The modulating signals thus produced have been band limited by virtue of the ramp transitions between the high and low data states and the shaping filtering produced by the diode shaper circuits and low pass filters.

The channelizer 60 is described in further detail in reference to FIG. 3. The data comprising the digital input signal is passed through line 14 to the first input of an exclusive OR gate 102. Line 14 is also connected to the first input of an exclusive OR gate 104. The output of gate 102 is connected to the D input of a flip-flop 106. The clock signal on line 18 is input to the clock input of flip-flop 106. The Q output of flip-flop 106 is connected to the second input of gate 104.

The output of gate 104 is provided to the first input of an exclusive OR gate 108. The gate 108 functions as an inverter by receiving a fixed data state "1" at the second input thereof. The output from gate 108 is provided to the D input of a flip-flop 110. The clock input at line 18 is also connected to the clock input of flip-flop 110. The Q output of flip-flop 110 is provided to the second input of the exclusive OR gate 102.

The channelizer 60 functions as a two-phase to four-phase converter and produces the signals I, Ī, Q and $\overline{Q}$. The I output is taken at the Q terminal of flip-flop 106 and the Ī output is taken at the $\overline{Q}$ terminal of flip-flop 106. The Q output is taken at the Q output of flip-flop 110 and the $\overline{Q}$ output is taken at the $\overline{Q}$ output of 110.

Relevant waveforms which illustrate the operation of the modulating circuit of the present invention, as shown in FIGS. 1 and 2, are illustrated in FIG. 4. Each waveform is labeled by the line which carries the signal or component which produces the signal. At the bottom of FIG. 4 there is shown the phase of the carrier after modulation at the output of amplifier 54.

In FIG. 5 there are illustrated waveforms which show the integration operation for producing the data signal and also show the effect of the low pass filter elements which include the diode shaper circuits and the low pass filters.

Referring now to FIG. 2 and the corresponding waveforms in FIGS. 4 and 5, the channelizer 60 produces four digital signals which serve to trigger the one shot circuits 70, 72, 74 and 76. The pulse outputs from the one shot circuits are integrated by the integrate and hold cicuits 80 and 82 to produce ramp transitions between the high and low level data states. This reduces the bandwidth of the modulating signal by eliminating the high speed transitions between the data states. The filtering circuits further serve to round off the sudden slope change of transitions caused by the start and stop of the integration process. The resulting modulating signals at lines 56 and 58 thus have a shaped spectrum which has a substantially narrower bandwidth than the digital input signal provided at line 14 for the data. The elimination of the high frequency components from the modulating signal serves to prevent the generation of corresponding high frequency components in the phase modulation of the carrier signal in the mixers 36 and 40. This in turn eliminates the need for bandpass filtering for the modulated carrier signal.

In summary, the present invention comprises a method and apparatus for modulating a carrier signal at the transmit frequency by use of the shaped spectrum modulating signals which are produced without the use of bandpass filters. The method and apparatus of the present invention further eliminates the need for a frequency translator in the modulating circuit.

Although one embodiment of the invention has been illustrated in the accompanying drawings and described in the foregoing detailed description, it will be understood that the invention is not limited to the embodiment disclosed, but is capable of numerous rearrangements, modifications and substitutions without departing from the scope of the invention.

We claim:

1. A method for producing a shaped spectrum modulating signal, comprising the steps of:
    generating quadrature I and Q channel digital signals derived from an input signal wherein the I and Q channel signals have first and second data states,
    detecting transitions between the first and the second data states for each of the I and Q channel signals,
    generating first and second data signals from the I and the Q channel signals, respectively, each of the data signals having a positive ramp signal segment upon the detection of a transition from the first data state to the second data state for the corresponding one of the I and the Q channel signals, and each of the data signals having a negative ramp signal segment upon the detection of a transition from the second data state to the first data state for the corresponding one of the I and the Q channel signals,
    low pass filtering the first data signal to produce a shaped spectrum I channel modulating signal, and
    low pass filtering the second data signal to produce a shaped spectrum Q channel modulating signal.

2. A method as recited in claim 1 wherein the step of detecting transitions between the first and second data states comprises the steps of:
    producing logically inverse signals derived from said I and Q channel digital signals, and
    applying said inverse signals respectively to first and second one shot circuits wherein a selected signal transition in said inverse signals triggers the corresponding one of said one shot circuits.

3. A method as recited in claim 1 wherein the step of generating a positive ramp signal segment comprises a step of positive signal integration and the step of generating a negative ramp signal segments comprises negative signal integration.

4. A method as recited in claim 1 wherein the steps of low pass filtering comprises passing said first and second data signals sequentially through a diode shaper circuit and a low pass filter.

5. A method for producing a modulated, band limited carrier signal comprising the steps of:
    generating quadrature I and Q channel digital signals derived from an input signal wherein the I and Q channel signals have first and second data states,
    detecting transitions between the first and the second data states for each of the I and Q channel signals,
    generating first and second data signals from the I and the Q channel signals, respectively, each of the data signals having a positive ramp signal segment upon the detection of a transition from the first data state to the second data state for the corresponding one of the I and the Q channel signals, and each of the data signals having a negative ramp signal segment upon the detection of a transition from the second data state to the first data state for the corresponding one of the I and the Q channel signals,
    low pass filtering the first data signal to produce a shaped spectrum I channel modulating signal,
    low pass filtering the second data signal to produce a shaped spectrum Q channel modulating signal,
    modulating the carrier signal with the I channel modulating signal to produce a first modulated carrier signal, and
    modulating the quadrature carrier signal with the Q channel modulating signal to produce a second modulated character signal.

6. A method as recited in claim 5 wherein the step of detecting transitions comprises the steps of:
    producing logically inverse signals derived from said I and Q channel signals, and
    applying said inverse signals respectively to first and second one shot circuits wherein a selected signal transition in said inverse signals triggers the corresponding one of said one shot circuits.

7. A method as recited in claim 5 wherein the step of producing the first and second data signals comprises positive integration to produce said positive ramp signal segment and negative integration to produce said negative ramp signal segment.

8. A method as recited in claim 5 wherein the step of modulating said carrier signal comprises the step of phase modulating said carrier signal.

9. A method for producing a modulated, band limited carrier signal comprising the steps of:
    producing quadrature component I and Q channel digital signals derived from a digital input signal wherein said I and Q channel signals and said input signal have first and second data states,
    detecting transitions between said first and second data states for each of said I and said Q channel signals,
    producing first and second data signals from said I and said Q channel signals respectively, each of said data signals having a positive ramp signal segment upon the detection of a transition from said first data state to said second data state for the corresponding one of said I and said Q channel signals and for generating a negative ramp signal segment upon the detection of a transition from said second state to said first state for the corresponding one of said I and Q channel signals,
    low pass filtering said first data signal to produce a shaped spectrum I channel modulating signal,
    low pass filtering said second data signal to produce a shaped spectrum Q channel modulating signal,
    phase shifting an in-phase carrier signal to produce a quadrature carrier signal,
    modulating said in-phase carrier signal with said I channel modulating signal to produce a first modulated carrier signal,
    modulating said quadrature carrier signal with said Q channel modulating signal to produce a second modulated carrier signal, and
    combining said first and second modulated carrier signals to produce said modulated band limited carrier signal.

10. A method as recited in claim 9 wherein the step of detecting transitions comprises the steps of:
    producing logically inverse signals for each of said I and said Q channel signals, and
    applying said inverse signals respectively to first, second, third and fourth one shot circuits wherein a selected signal transition in said inverse signals triggers the corresponding one of said one shot circuits.

11. A method as recited in claim 9 wherein the step of producing first and second data signals comprises positive integration to produce said positive ramp signal segment and negative integration to produce said negative ramp signal segment.

12. A method as recited in claim 9 wherein each of the steps of modulating comprises the step of phase modulating.

13. A circuit for producing a shaped spectrum modulating signal, comprising:
   means for generating quadrature I and Q channel digital signals derived from a digital input signal wherein the I and the Q channel signals have first and second data states,
   means for detecting transitions between the first and second data states for each of the I and the Q channel signals,
   means for generating first and second data signals from the I and the Q channel signals, respectively, each of the data signals having a positive ramp signal segment upon the detection by said means for detecting of a transition from the first data state to the second data state for the corresponding one of the I and the Q channel signals and for generating a negative ramp signal segment upon the detection by said means for detecting of a transition from the second data state to the first data state for the corresponding one of the I and the Q channel signals,
   means for low pass filtering said first data signal to produce a shaped spectrum I channel modulating signal, and
   means for low pass filtering the second data signal to produce a shaped spectrum Q modulating signal.

14. A circuit as recited in claim 13 wherein said means for generating a data signal comprises an integration circuit which produces said data signal with positive integration for producing said positive ramp signal segments and negative integration for producing said negative ramp signal segments.

15. A circuit as recited in claim 13 wherein said means for low pass filtering comprises a diode shaper circuit serially connected to a low pass filter.

16. A circuit for producing a modulated, band limited carrier signal comprising:
   means for generating quadrature I and Q channel digital signals derived from a digital input signal wherein said I and said Q channel signals have first and second data states,
   means for detecting transitions between said first and said second data states for each of said I and said Q channel signals,
   means for generating first and second data signals from said I and said Q channel signals respectively, each of said data signals having a positive ramp signal segment upon the detection by said means for detecting of a transition from said first data state to said second data state for the corresponding one of said I and said Q channel signals and for generating a negative ramp signal segment upon the detection by said means for detecting of a transition from said second data state to said first data state for the corresponding one of said I and said Q channel signals,
   means for low pass filtering said first data signal to produce a shaped spectrum I channel modulating signal,
   means for low pass filtering said second data signal to produce a shaped spectrum Q channel modulating signal,
   means for phase shifting an in-phase carrier signal to produce a quadrature carrier signal,
   means for modulating said in-phase carrier signal with said I channel modulating signal to produce a first modulated carrier signal,
   means for modulating said quadrature carrier signal with said Q channel modulating signal to produce a second modulated carrier signal, and
   means for combining said first and said second modulated carrier signals to produce said modulated, band limited carrier signal.

17. A circuit as recited in claim 16 wherein said means for detecting transitions comprises:
   means for producing first and second logical inverse signals respectively for said I and said Q channel signals, and
   first, second, third and fourth one shot circuits connected respectively to receive said I channel, said Q channel and said logical inverse signals, each of said one shot circuits producing an output pulse upon receipt of a selected signal transition by the signals provided to the one shot circuits.

18. A circuit as recited in claim 16 wherein said means for generating first and second data signals comprises first and second integration circuits which produce said data signals with positive integration for said positive ramp signal segments and negative integration for said negative ramp signal segments.

19. A circuit as recited in claim 16 wherein each of said means for low pass filtering comprises a diode shaper circuit serially connected to a low pass filter.

20. A circuit as recited in claim 16 wherein each of said means for modulating comprises a mixer.

21. A circuit as recited in claim 16 wherein each of said means for modulating comprises means for phase modulating.

22. A circuit as recited in claim 16 wherein said means for combining comprises a summation circuit.

* * * * *